(12) United States Patent
Fukasawa et al.

(10) Patent No.: US 6,663,705 B2
(45) Date of Patent: Dec. 16, 2003

(54) VULCANIZING ADHESIVE COMPOSITION

(75) Inventors: Kiyohumi Fukasawa, Kanagawa (JP); Yasuaki Kitajima, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/111,346

(22) PCT Filed: Sep. 21, 2001

(86) PCT No.: PCT/JP01/08219
§ 371 (c)(1), (2), (4) Date: Apr. 23, 2002

(87) PCT Pub. No.: WO02/24826
PCT Pub. Date: Mar. 28, 2002

(65) Prior Publication Data
US 2003/0004295 A1 Jan. 2, 2003

(30) Foreign Application Priority Data
Sep. 22, 2000 (JP) ..................................... 2000-287984

(51) Int. Cl.⁷ ............................................ C09D 18/307
(52) U.S. Cl. ..................... 106/287.11; 528/38; 556/425
(58) Field of Search ..................... 106/287.11; 556/425; 528/28

(56) References Cited

U.S. PATENT DOCUMENTS 3,022,196 A * 2/1962 Jenkins et al. ......... 106/287.11
4,455,343 A * 6/1984 Temple ...................... 428/285
5,728,203 A * 3/1998 Vorse et al. ............ 106/287.11
5,907,015 A * 5/1999 Sexsmith .................... 524/837

FOREIGN PATENT DOCUMENTS

| EP | 0 403 100 A1 | 12/1990 |
|---|---|---|
| EP | 0 505 115 A2 | 9/1992 |
| EP | 0 578 893 A1 | 1/1994 |
| JP | 6-228525 | 8/1994 |
| JP | 6-279732 | 10/1994 |
| JP | 6-279747 | 10/1994 |
| JP | 2000-272045 | 10/2000 |

\* cited by examiner

*Primary Examiner*—Margaret G. Moore
(74) *Attorney, Agent, or Firm*—Butzel Long

(57) ABSTRACT

A vulcanizing adhesive composition comprising a copolymerization oligomer of amino group-containing alkoxysilane and vinyl group-containing alkoxysilane, a nonionic surfactant of HLB 10–16 and an acid compound is an aqueous vulcanizing adhesive composition free from an organic solvent and for use in bonding of fluororubber to a metal, which is also effectively applicable to any of polyol-vulcanizable fluororubber and peroxide-vulcanizable fluororubber, showing a good adhesiveness even to stainless steel of poor wettability toward the conventional aqueous adhesive.

6 Claims, No Drawings

VULCANIZING ADHESIVE COMPOSITION

TECHNICAL FIELD

The present invention relates to a vulcanizing adhesive composition, and more particularly to a vulcanizing adhesive composition effectively applicable to bonding of fluororubber to a metal, etc.

BACKGROUND ART

Most of silane-based adhesives for fluororubber so far used contain an organic solvent harmful to human bodies or global environments. JP-A-5-86335 on the other hand discloses an aqueous adhesive composition comprising an alkoxysilane compound and an unsaturated acid compound, but the wettability toward metals is not good with poor adhesiveness; and its adhesiveness is satisfactory only for polyol-vulcanizable fluororubber, but not for peroxide-vulcanizable fluororubber.

DISCLOSURE OF THE INVENTION

An object of the present invention is to provide an aqueous vulucanizing adhesive composition free from any organic solvent and effectively applicable to both polyol-vulcanizable fluororubber and peroxide-vulcanizable fluororubber, and also showing an effective adhesiveness to stainless steel to which the conventional aqueous adhesives have shown a poor adhesiveness.

The object of the present invention can be attained by a vulcanizing adhesive composition, which comprises a copolymerization oligomer of amino group-containing alkoxysilane and vinyl group-containing alkoxysilane, a nonionic surfactant of HLB 10–16, and an acid compound.

Amino group-containing alkoxysilane for use in the present invention as one component for the copolymerization oligomer includes, for example, γ-aminopropyltriethoxysilane, γ-aminopropyltrimethoxysilane, N-β-(aminoethyl)-γ-aminopropyltrimethoxysilane, N-β-(aminoethyl)-β-aminopropyltriethoxysilane, etc. These amino group-containing alkoxysilanes, when used directly as a member of the adhesive composition, fail to give a good adhesive because no satisfactory film can be obtained, and thus are used in the form of copolymerization oligomers with vinyl group-containing alkoxysilanes.

Vinyl group-containing alkoxysilane for use in the present invention as another component of the copolymerization oligomer includes, for example, vinyltrimethoxysilane, vinyltriethoxysilane, etc. The vinyl group-containing alkoxysilanes are insoluble in water, separable as an oil layer and immiscible with other components. Their oligomers are also insoluble in water to form precipitates. Thus, the vinyl group-containing alkoxysilanes are used as oligomers with amino group-containing alkoxysilanes.

In the oligomerization reaction, 0.2–1 mole, preferably 0.5–1 mole, of vinyl group-containing alkoxy-silane and 1–5 moles of water are used per mole of amino group-containing alkoxysilane. These components are charged into a reactor with a distillation apparatus and a stirrer and stirred at about 60° C. for about one hour. Then, about 1- about 2 moles of an acid, for example, formic acid, is added thereto per mole of amino group-containing alkoxysilane within one hour, where the temperature is kept at about 65° C. . Then, stirring is continued for 1–5 hours to proceed with the reaction, while distilling off alcohol resulting from hydrolysis under reduced pressure. The distillation is discontinued when the distillate turns only water. Then, the desired copolymerization oligomers can be obtained by adjusting the silane concentration to 30–80 wt. % by dilution. Alternatively, commercially available copolymerization oligomers can be used as such.

Any of nonionic surfactants can be used, but it is preferable to use those having HLB 10–16, preferably 12–14, for example, polyoxyethylene alkyl ether, polyoxyethylene higher alcohol ether, polyoxyethylene fatty acid ester, etc. Those of lower HLB than 10 are insoluble in water, making the solution white turbid, whereas those of higher HLB than 16 have a poor effect on wettability improvement. Acid compound for use in the present invention includes an organic acid such as formic acid, acetic acid, etc. and an inorganic acid such as hydrochloric acid, nitric acid, etc.

In addition to the foregoing component, an amino group-containing alkoxysilane oligomer can be used together with the amino/vinyl group-containing alkoxy-silane copolymerization oligomer to reduce the proportion of the latter to be used. In that case, it is necessary to add an acid compound dropwise to the amino group-containing alkoxysilane oligomer in advance to make pH to 4–5. The amino group-containing alkoxysilane oligomer can be obtained by charging one mole of an amino group-containing alkoxysilane and 5–50 moles of distilled water into a reactor with a distillation apparatus and a stirrer, followed by stirring at about 40°- about 60° C. for about 5- about 48 hours to proceed with the reaction, while distilling off alcohol resulting from hydrolysis under reduced pressure. Alternatively, commercially available oligomer products can be used as such. The amino group-containing alkoxysilane oligomer can be used in a proportion of not more than about 10 parts by weight, preferably about 0.5- about 3 parts by weight on the basis of one part by weight of the copolymerization oligomer.

The present vulcanizing adhesive composition can be prepared by diluting the copolymerization oligomer to a concentration of about 0.5- about 10%, preferably about 1- about 5%, by distilled water, and adding a nonionic surfactant and an acid compound to make about 0.01- about 0.5%, preferably about 0.05- about 0.2%, and about 0.1- about 5%, preferably about 0.2- about 1%, respectively, on the basis of the entire composition, followed by stirring for a few minutes.

The vulcanizing adhesive composition thus prepared can be effectively used in the vulcanization bonding between fluororubber and metals, etc. That is, the composition is applied to a metal such as mild steel, stainless steel, aluminum, aluminum die-cast, etc., dried at room temperature- about 80° C. for about 2- about 10 minutes and baked at about 100°- about 200° C. for about 5- about 10 minutes, thereby bonding unvulanized fluororubber compounds thereto, followed by vulcanization under pressure at about 180°- about 200° C. .

Any of polyol-vulcanizable fluororubber and peroxide-vulcanizable fluororubber can be used, and unvulcanized fluororubber compounds include, for example, the following formulations:

|  | Parts by weight |
|---|---|
| (Formulation I) | |
| Fluororubber (Viton E45, made by DuPont) | 100 |
| Calcium metasilicate | 40 |
| MT carbon black | 2 |

-continued

|  | Parts by weight |
|---|---|
| Magnesium oxide (Magnesia #150, made by Kyowa Kagaku K.K.) | 6 |
| Calcium hydroxide | 3 |
| Vulcanizing agent (Curative #30, made by DuPont) | 2 |
| Vulcanization promoter (Curative #20, made by DuPont) | 1 |
| (Formulation II) | |
| Fluororubber (Diel G901, made by Daikin Industries, Ltd.) | 100 |
| Calcium metasilicate | 20 |
| MT carbon black | 20 |
| Magnesium oxide (Magnesia #150) | 6 |
| Calcium hydroxide | 3 |
| Triallyl isocyanurate | 1.8 |
| Organic peroxide (Perhexa 25B, made by NOF Corp.) | 0.8 |

Polyol-vulcanizable fluororubber generally includes copolymers of vinylidene fluoride with at least one of other fluorine-containing olefins such as hexa-fluoropropene, pentafluoropropene, tetrafluoroethylene, trifluorochloroethylene, vinyl fluoride, perfluoro (methyl vinyl ether), etc., and these fluororubbers can be polyol-vulcanized by a polyhydroxy-aromatic compound such as 2,2-bis (4-hydroxyphenyl) propane, 2,2-bis (4-hydroxyphenyl) perfluoropropane, hydroquinone, etc.

Peroxide-vulcanizable fluororubber includes fluororubbers containing iodine and/or bromine in the molecule, and these fluororubbers can be vulcanized (cross-linked) by an organic peroxide so for usually used in the peroxide vulcanization. In that case, it is preferable to use a multifunctional unsaturated compound typified by triallyl isocyanurate together with the organic peroxide.

BEST MODES FOR CARRYING OUT THE INVENTION

The present invention will be described below, referring to Examples.

EXAMPLE 1

442.2 g (2 moles) of γ-aminopropyltriethoxysilane, 296.2 g (2 moles) of vinyltrimethoxysilane and 144 g (8 moles) of water were charged into a reactor with a distillation apparatus and a stirrer, and stirred at a temperature adjusted to about 60° C. for about one hour. Then, 119.1 g (1.1 mole) of 85 wt. % formic acid was added thereto within one hour, where the temperature was set to about 65° C. Stirring was further continued for 3 hours to proceed with the reaction, while distilling off alcohol resulting from hydrolysis under reduced pressure. Distillation was discontinued when the distillate turned only water, and then water was added thereto to make the total amount 923.0 g, whereby a copolymerization oligomer with a stable pH of 4–5 (silane concentration : about 80 wt. % ; amino group/vinyl group =1/1) was obtained.

A vulcanizable adhesive composition was prepared in the following manner, using the resulting copolymerization oligomer.

|  | Parts by weight |
|---|---|
| Aqueous amino/vinyl group-containing alkoxysilane copolymerization oligomer solution | 3.8 |
| Nonionic surfactant (polyoxyethylene lauryl ether (Emulgen 108, made by Kao Corp., HLB = 12) | 0.01 |
| Formic acid | 0.2 |
| Distilled water | 95.99 |

The foregoing components were mixed together and stirred for a few minutes to prepare a vulcanizing adhesive composition. The composition was subjected to measurement of surface tension (by a pendant drop method) and contact angle to a zinc phosphate-treated steel plate or stainless steel plate (SUS304) (by JIS R-6237).

At the same time, the composition was applied to the zinc phosphate-treated steel plate or defatted stainless steel plate, dried at 80° C. for 3 minutes and baked in an oven at 170° C. for 10 minutes, followed by bonding of unvulcanized fluororubber compound of the aforementioned Formulation I or II, then vulcanized to bond at 180° C. for 6 minutes. The resulting bonded plates were subjected to measurement of adhesion strength and percent rubber-retained area by a 90 peeling test (JIS K-6256, section 5).

EXAMPLE 2

442.8g (2 moles) of γ-aminopropyltriethoxysilane and 648 g (36 moles) of water were charged into a reactor with a distillation apparatus and a stirrer and stirred at a temperature adjusted to about 60° C. for about 5 hours to proceed with the reaction, while distilling off alcohol resulting from hydrolysis under reduced pressure. Distillation was discontinued when the distillate turned only water, and then water was added thereto to make the total amount 1,107 g, whereby a γ-amino-propyltriethoxysilane oligomer (silane concentration : 40 wt. %) was obtained. A vulcanizing adhesive composition was prepared in the following manner, using the resulting oligomer and the copolymerization oligomer of Example 1.

|  | Parts by weight |
|---|---|
| Aqueous amino/vinyl group-containing alkoxysilane copolymerization oligomer solution | 1.8 |
| Aqueous γ-aminopropylethoxysilane oligomer solution | 3.8 |
| Nonionic surfactant (Emulgen 108, made by Kao Corp.) | 0.01 |
| Formic acid | 0.2 |
| Distilled water | 94.19 |

Preparation of a vulcanizing adhesive composition using the foregoing components and measurement were carried out in the same manner as in Example 1.

COMPARATIVE EXAMPLE 1

|  | Parts by weight |
|---|---|
| Commercially available, solvent dilution type adhesive (Chemlock AP-133, made by Rhode Far East Co.) | 20 |
| Methanol | 80 |

Preparation of a vulcanizing adhesive composition using the foregoing components and measurement were carried out in the same manner as in Example 1.

COMPARATIVE EXAMPLE 2

|  | Parts by weight |
|---|---|
| γ-aminopropyltriethoxysilane | 1 |
| Methacrylic acid | 0.4 |
| Distilled water | 98.6 |

Preparation of a vulcanizing adhesive composition using the foregoing components and measurement were carried out in the same manner as in Example 1.

Results of measurement in the foregoing Examples and Comparative Examples are shown in the following Table.

TABLE

| Measurement items | Ex. 1 | Ex. 2 | Comp. Ex. 1 | Comp. Ex. 2 |
|---|---|---|---|---|
| Surface tension (mN/m) | 29 | 29 | 22 | 65 |
| Contact angle (°) |  |  |  |  |
| Zinc phosphate-treated steel plate | <10 | <10 | <10 | 30 |
| SUS 304 | 19 | 17 | <10 | 70 |
| Adhesion strength (N/mm) |  |  |  |  |
| Zinc phosphate-treated steel plate |  |  |  |  |
| Formulation I | 5.4 | 5.3 | 5.4 | 5.2 |
| Formulation II | 6.2 | 6.1 | 6.0 | 4.2 |
| Defatted SUS 304 |  |  |  |  |
| Formulation I | 5.3 | 5.3 | 5.3 | 4.8 |
| Formulation II | 6.2 | 6.2 | 6.0 | 4.0 |
| Percent rubber-retained area (%) |  |  |  |  |

TABLE-continued

| Measurement items | Ex. 1 | Ex. 2 | Comp. Ex. 1 | Comp. Ex. 2 |
|---|---|---|---|---|
| Zinc phosphate-treated steel plate |  |  |  |  |
| Formulation I | 100 | 100 | 100 | 80 |
| Formulation II | 100 | 100 | 90 | 30 |
| Defatted SUS 304 |  |  |  |  |
| Formulation I | 100 | 100 | 100 | 60 |
| Formulation II | 100 | 100 | 85 | 20 |

INDUSTRIAL APPLICABILITY

The present vulcanizing adhesive composition is an aqueous adhesive without any use of an organic solvent as in the conventional vulcanizing adhesive, and shows a good adhesiveness even to stainless steel of poor wettability toward the conventional aqueous adhesive and can be bonded to any of polyol-vulcanizable fluororubber and peroxide-vulcanizable fluororubber.

What is claimed is:

1. A vulcanizing adhesive composition for use in bonding of fluororubber to a metal, which comprises a copolymerization oligomer of 1 mole of an amino group-containing alkoxysilane and 0.2–1 mole of a vinyl group-containing alkoxysilane, a nonionic surfactant of HLB 10–16 and an acid compound.

2. A vulcanizing adhesive composition, according to claim 1, prepared into as an aqueous solution.

3. A vulcanizing adhesive composition, according to claim 1, wherein the fluororubber is at least one of a polyol-vulcanizable and a peroxide-vulcanizable fluororubber.

4. A vulcanizing adhesive composition, which comprises a copolymerization oligomer of an amino group-containing alkoxysilane and a vinyl group-containing alkoxysilane, an amino group-containing alkoxysilane oligomer, a nonionic surfactant of HLB 10–16 and an acid compound.

5. A vulcanizing adhesive composition, according to claim 4, prepared as an aqueous solution.

6. A vulcanizing adhesive composition, according to claim 4, wherein the fluororubber is at least one of a polyol-vulcanizable and a peroxide-vulcanizable fluororubber.

* * * * *